May 29, 1956  D. E. ROYER  2,747,593
VALVE MECHANISM

Filed July 3, 1952  2 Sheets—Sheet 1

INVENTOR.
DARRELL E. ROYER
BY
Willets, Hardman and Felix
ATTORNEYS

May 29, 1956 D. E. ROYER 2,747,593
VALVE MECHANISM

Filed July 3, 1952 2 Sheets-Sheet 2

INVENTOR.
DARRELL E. ROYER
BY
Willits, Hardman and Felix
ATTORNEYS

2,747,593

VALVE MECHANISM

Darrell E. Royer, Vandalia, Ohio, assignor to General Motors Corporation, Detroit, Mich., a corporation of Delaware Application July 3, 1952, Serial No. 297,066

6 Claims. (Cl. 137—45)

The present invention relates to valve mechanism, and more particularly to rotary valve mechanism for controlling the connection of a pump intake with one or more of a plurality of inlet openings in a reservoir.

In variable pitch aircraft propellers which are controlled by a fluid pressure system contained within rotatable structure, the provision of means for altering the propeller pitch while the propeller is not rotating is of paramount importance. Generally, these means embody an electric motor driven pump for supplying the requisite flow when the pumps normally operated by rotation of the propeller are inoperative. However, the electric driven pump may be operated at any time when the propeller driven pumps fail to supply the flow requirements of the system. This invention is particularly adapted for utilization with propeller mechanism of the type wherein the several pumps are disposed within a rotatable reservoir containing hydraulic fluid. The reservoir may take the form of a regulator of toroid configuration with the several pumps mounted on a side wall thereof. The reservoir is filed with fluid to a predetermined level so that upon rotation of the regulator structure, the fluid medium forms a ring circumscribing the axis of rotation due to centrifugal force. As the auxiliary pump is operable when the regulator is rotating or stationary, the necessity of a plurality of inlet openings communicating with the reservoir and a valve mechanism for controlling the connection between the submerged inlets and the pump intake is readily apparent. Accordingly, one of my objects is to provide automatically operable valve means for connecting a pump intake with only the inlet opening or openings which are submerged or immersed in the liquid medium.

The aforementioned and other objects are accomplished in the present invention by providing a rotary valve mechanism actuated by a free swinging mass. Specifically, the auxiliary pump has a single intake passage that connects with a central recess of a rotary valve piston. The piston is provided with a single opening through its periphery which communicates with the central recess, and is rotatably journalled within a fixed cylinder. The cylinder has three radially extending openings, the centers of which are spaced substantially 120° apart. Each of the cylinder openings or ports is connected by means of a conduit with an intake or sump opening exposed to the reservoir, the intake openings likewise being spaced substantially 120° apart. The mass or weight element is attached to an extension of the rotary piston such that any position the mass assumes due to centrifugal force or gravity, the piston valve assumes a corresponding position. When the propeller unit is rotating, the mass will assume and maintain a radial position within the regulator under the effect of centrifugal force. As the fluid medium forms a ring or toroid within the regulator under the effect of centrifugal force, all of the inlet openings will be submerged. Accordingly, the particular position of the rotary piston valve is immaterial. However, when the propeller unit is stationary, the free mass and the valve piston will assume a position under the effect of gravity and in so doing will only connect the port or ports of the valve cylinder with the pump intake whose sump openings are submerged. This condition will prevail regardless of the particular location of the valve assembly within the regulator with respect to the axis of rotation.

Further objects and advantages of the present invention will be apparent from the following description, reference being had to the accompanying drawings wherein a preferred embodiment of the present invention is clearly shown.

Referring more particularly to the drawings, the invention is exemplified in connection with a variable pitch propeller of the type generally disclosed and claimed in the Blanchard et al. Patent 2,307,102. The propeller unit incudes a hub 1 in which a plurality of propeller blades 2 are journalled for rotation about their longitudinal axes for pitch adjustment. Rigidly attached to the propeller hub 1 is a regulator 3 within which is disposed a fluid pressure system for controlling the pitch position of the propeller blades. The propeller unit including the hub 1 and the regulator 3 is driven by a shaft 4.

Figure 2:
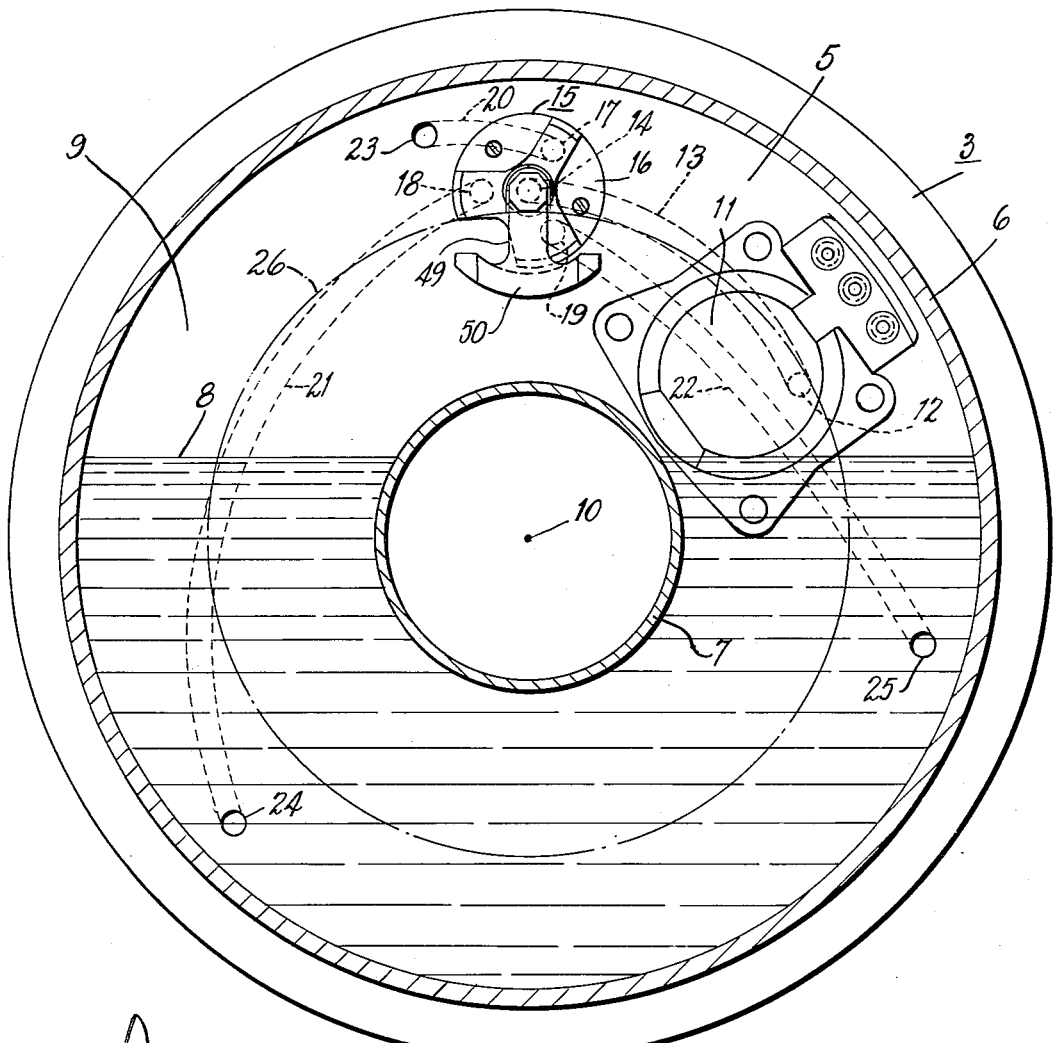
Fig. 2 is a sectional view through the regulator along line 2—2 of Fig. 1, with certain parts removed.
Figure 1:
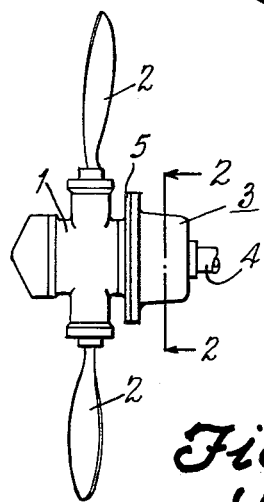
Fig. 1 is a perspective view of a variable pitch propeller unit embodying the invention.

With particular reference to Fig. 2, the regulator 3 includes a front plate 5 which may be flange connected to the propeller hub 1, a cover assembly 6 and a stationary adapter sleeve 7 about which the front plate and cover assembly 6 rotate. The several elements of the regulator structure aforedescribed define a reservoir 9 which contains a quantity of hydraulic fluid 8. The quantity of hydraulic fluid contained within the reservoir 9 varies with the specific type of propeller mechanism and in the instant disclosure, the reservoir is filled to approximately 10° above the axis of rotation 10.

The specific regulator structure is similar to that disclosed in copending application, Serial No. 202,612, filed December 26, 1950, in the name of Treseder et al., now Patent No. 2,699,304, issued January 11, 1955, in which an electric motor driven pump 11 is utilized to supply the flow requirements of the pressure system when the pumps, driven by propeller rotation, are unable to meet the system requirements. The electrical connections to the electric motor driven pump 11 are provided through a brush and slip ring assembly, not shown, which is similar in character to the structure embraced in the aforementioned Treseder et al. application. Suffice it here to say that the electric motor driven pump 11 may be operated at any time when the propeller unit is rotating below a predetermined speed or when it is stationary, to supply the requisite flow to effect pitch changes of the blades 2. The electric motor driven pump 11 is suitably attached to the front plate 5 on a mounting pad thereof. The pump is provided with an intake opening 12, which is connected by conduit means 13 within the front plate 5 to the outlet 14 of a rotary inlet valve mechanism 15. The present invention contemplates the use of a rotary valve mechanism to assure a supply of hydraulic medium to the intake opening 12 of the pump at all times. The rotary valve mechanism 15 is likewise supported by means of a mounting pad, not shown, on the front plate 5 of the regulator structure.

The valve mechanism 15 includes a valve casing or housing 16 having three inlet openings 17, 18, and 19, which are connected by conduit means 20, 21, and 22, respectively, to three openings 23, 24, and 25 in the front plate which communicate with the reservoir 9. The conduits 20, 21, and 22 are likewise disposed within the front plate 5 and the openings 23, 24, and 25 are spaced substantially 120° apart within the reservoir 9. The location of the openings 23, 24, and 25 is such that upon rotation of the regulator 3, each of the openings will be submerged in the fluid medium 8 which forms a toroid, indicated by the dash line 26, under the effect of centrifugal force. However, when the regulator 3 is stationary, only one or two of the openings 23, 24, and 25 will be submerged within the fluid medium 8, depending on the particular location of the valve mechanism 15 with respect to the axis of rotation 10.

Referring more particularly to Figs. 3 to 6, the valve casing 16 includes a flange portion provided with a pair of holes 27 and 28 by which the valve assembly 15 may be attached to the front plate of the regulator. In addition, the housing includes three radially extending arm portions 29, 30, and 31, which are spaced equal distances apart. The arms are hollow and connect with the inlet openings 17, 18, and 19. The outer ends of the hollow arms are closed by suitable plugs 32, 33, and 34. The inner ends of the arms provide a support for a cylinder 35, which is mounted in a steeped bore 36 of the housing. The cylinder 35 is provided with three elongated ports 37, 38, and 39, which communicate, respectively, through the hollow arms with inlet openings 17, 18, and 19. The cylinder 35 is immovably retained in the larger diameter portion of the stepped bore 36, by means to be described.

Figure 3:
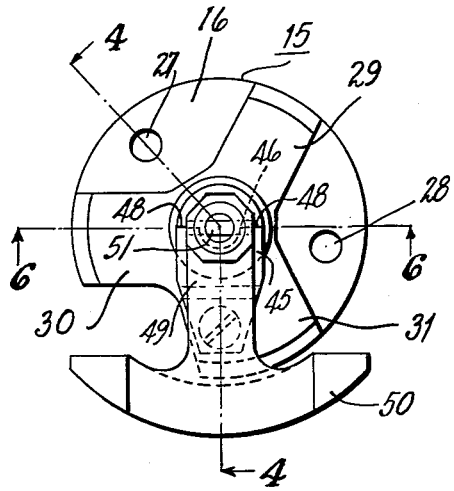
Fig. 3 is a view in elevation of the valve assembly.
Figure 4:
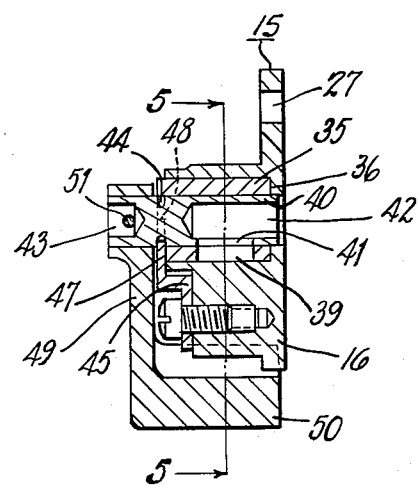
Fig. 4 is a sectional view taken on line 4—4 of Fig. 3.
Figure 5:
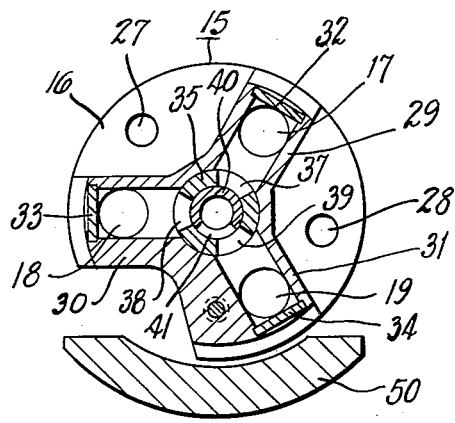
Fig. 5 is a sectional view taken on line 5—5 of Fig. 4.
Figure 6:
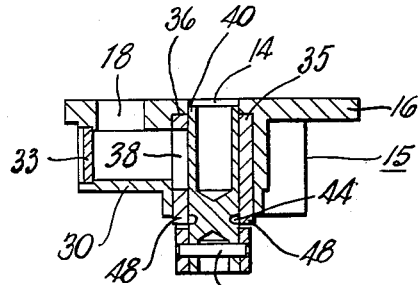
Fig. 6 is a sectional view taken on line 6—6 of Fig. 3
Figure 7:
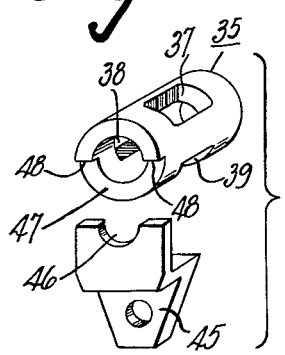
Fig. 7 is a view in perspective of certain parts of the valve mechanism.

Rotatably journalled within the bore of the cylinder 35 is a rotary valve piston 40 having a single elongated port 41. The piston 40 also has engagement with the smaller diameter portion of the stepped bore 36. The piston is provided with a pair of opposed circular recesses 42 and 43, as well as an annular groove 44 in the portion intermediate the axially extending recesses. A retaining plate 45 secured to the casing 17 by means of a screw device is formed with a semi-circular notch 46 in one of its ends, which is adapted to engage the annular groove 44 of the piston to retain the same in position and prevent axial movements thereof relative to the casing 16. One end of the cylinder 35 is provided with a semi-circular relieved portion presenting a surface 47, which is engaged by the retaining plate 45 whereby axial movements of the cylinder 35 relative to the casing 16 are precluded. Relative rotary movements of the cylinder 35 with respect to the casing 16 are prevented by the extending semi-cylindrical portion of the cylinder presenting surfaces 48 for engagement with the bifurcated end of retaining plate 45 having the semi-circular notch 46 therein, as is shown in Figs. 3 and 7.

Rotary movements of the piston 40 are effected by a free swinging mass or weight 50. The weight 50 is of arcuate configuration and is connected by means of a leg 49 to the end of the rotary piston 40 having recess 43. The leg 49 is rigidly attached to the piston 40 by means of a stake 51. The casing 16 presents a generally circular outline, thereby allowing the mass 50 to assume any position with respect thereto under either the effects of gravity or centrifugal force. The stepped bore 36 of the casing 16 forms the outlet opening 14 of the valve assembly which is connected by conduit 13 to the intake opening 12 of the pump 11, as is shown in Fig. 2.

The principle of operation is as follows: During propeller rotation, the free swinging mass 50 will assume a radial position within the regulator 3, which position will be maintained during propeller rotation above a predetermined speed. The particular position that the mass 50 assumes is not material since each of the openings 23, 24, and 25 is submerged within the hydraulic fluid medium 8, which, during regulator rotation, forms a toroid as aforedescribed. Accordingly, the inlet opening, which is connected through the rotary valve piston 40 to the outlet opening of the valve assembly, will always be submerged in the fluid medium, thereby assuring a supply of hydraulic fluid to the pump 11. However, when the regulator and propeller are not rotating, the free swinging mass 50 will assume a position under the effect of gravity in which position, it will only connect the inlet opening or openings with the pump intake which are submerged in the hydraulic fluid medium 8 contained within the reservoir. This result will occur by the reason of the mass 50 assuming positions in parallel vertical planes regardless of the particular location of the valve assembly 15 with respect to the axis of rotation 10 of the regulator. Thus, with reference to Fig. 2, opening 25 is connected by means of the rotary piston valve 40 to the intake valve of the pump 11. If the position of the valve assembly were diametrically opposed to the position it is shown in Fig. 2, opening 23 will be connected to the valve piston 40 to the intake of the pump 11. In the intermediate positions therebetween, one or possibly two of the inlet openings will be connected to the intake of the pump but in every instance, only the inlet opening or openings which are submerged will be so connected.

It is apparent from the aforegoing description that the present invention provides a valve mechanism which automatically insures a supply of fluid for its associated pump and prevents the entrance of air into the pump intake. In this manner the auxiliary pump, provided within the partially filled rotatable reservoir, is continually maintained in operative condition.

While the embodiment of the present invention as herein disclosed, constitutes a preferred form, it is to be understood that other forms might be adopted.

What is claimed is as follows:

1. Valve mechanism including, a valve housing having a bore therethrough, a ported cylinder disposed within said bore, a ported piston rotatably journalled within said cylinder, said piston having an annular groove intermediate its ends, a retaining member having a semi-circular notched portion adapted for engagement with said piston groove to prevent axial movement of the piston relative to the housing, said retaining member being rigidly connected to said housing, means including said retaining member for preventing relative movement between said cylinder and housing, and gravity actuated means operatively connected with said piston for determining the position of said ported piston within said ported cylinder.

2. A valve comprising, a housing having a bore therethrough, a ported cylinder disposed within said bore, a ported piston rotatably journaled within said cylinder, said piston having an annular groove between its ends, a retaining member attached to said housing and having a semi-circular notched portion arranged for engagement with said piston groove to prevent axial movement of the piston relative to the housing, and means including said retaining member for preventing relative movement between said cylinder and said housing.

3. A valve comprising, a valve housing having a bore therethrough, a ported cylinder disposed within said bore, a ported piston rotatably journaled within said cylinder, said piston having an annular groove between its ends, said cylinder having a semi-cylindrical projecting portion, and a retaining member attached to said housing and having a semi-circular notched portion arranged for engagement with said piston groove to prevent axial movement of the piston relative to the housing, said retaining member also being arranged to engage the longitudinal surfaces of said semi-cylindrical extension of the cylinder to thereby prevent rotation of the cylinder relative to the housing.

4. The combination set forth in claim 3 wherein said retaining member also includes a portion having engagement with an end surface of said cylinder for preventing relative axial movement between the cylinder and the housing.

5. A valve comprising, a housing having a bore therethrough, one end of which constitutes an outlet opening, said housing having a plurality of inlet openings, a cylinder disposed within said bore and having a plurality of spaced ports communicating with said inlet openings, a piston rotatably journaled within said cylinder, said piston having a peripheral port therein communicating with an axially extending recess having communication with said housing bore, said piston having an annular groove between its ends, and a retaining member attached to said housing and having a semi-circular notched portion which is received by the annular groove of said piston, said retaining member also having operative engagement with said cylinder for preventing relative movement between the cylinder and the housing.

6. A valve in accordance with claim 5 wherein said cylinder is formed with a complementary semi-cylindrical portion, and wherein the operative engagement betweeen said retaining member and said cylinder is constituted by contiguous surfaces of said semi-cylindrical notched portion of said retaining member and said semi-cylindrical portion of said cylinder.

References Cited in the file of this patent

UNITED STATES PATENTS

| | | |
|---|---|---|
| 1,608,120 | Price | Nov. 23, 1926 |
| 1,710,163 | Hartney | Apr. 23, 1929 |
| 1,845,136 | Dieter | Feb. 16, 1932 |
| 2,235,793 | Berger | Mar. 18, 1941 |
| 2,239,098 | Hunter | Apr. 22, 1941 |
| 2,364,119 | Anderson | Dec. 5, 1944 |
| 2,427,859 | Jeffrey | Sept. 23, 1947 |
| 2,570,557 | Johnson | Oct. 9, 1951 |